(12) United States Patent
Norimatsu

(10) Patent No.: US 8,917,301 B2
(45) Date of Patent: Dec. 23, 2014

(54) PRESSURE-SENSITIVE ADHESIVE FOR PRESSURE-SENSITIVE ADHESIVE TAPE, TAPE CASSETTE, AND TAPE PRINTER

(71) Applicant: Brother Kogyo Kabushiki Kaisha, Nagoya (JP)

(72) Inventor: Takahiro Norimatsu, Hekinan (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/230,490

(22) Filed: Mar. 31, 2014

(65) Prior Publication Data
US 2014/0210935 A1 Jul. 31, 2014

Related U.S. Application Data

(63) Continuation-in-part of application No. PCT/JP2012/073976, filed on Sep. 20, 2012.

(30) Foreign Application Priority Data

Oct. 7, 2011 (JP) ................................ 2011-222737

(51) Int. Cl.
*B41J 32/00* (2006.01)
*B41J 2/315* (2006.01)
*B41J 2/01* (2006.01)
*C09J 7/02* (2006.01)
*B41J 2/325* (2006.01)
*B41J 15/04* (2006.01)
*B41J 3/407* (2006.01)
*C09J 201/00* (2006.01)

(52) U.S. Cl.
CPC ........ *C09J 7/0207* (2013.01); *C09J 7/02* (2013.01); *B41J 2/325* (2013.01); *B41J 15/044* (2013.01); *B41J 3/4075* (2013.01); *C09J 201/00* (2013.01)
USPC .......................... 347/214; 347/212; 347/105

(58) Field of Classification Search
USPC ......... 347/101, 105, 171, 212, 214, 215, 217, 347/218, 219; 428/32.31, 42.3, 542.2; 503/227
See application file for complete search history.

(56) References Cited

U.S. PATENT DOCUMENTS 6,482,489 B1 * 11/2002 Otaki et al. .................. 428/42.3
6,731,319 B2 * 5/2004 Ichikawa et al. ............. 347/212
(Continued)

FOREIGN PATENT DOCUMENTS

JP H05-117613 A 5/1993
JP H11-158453 A 6/1999
(Continued)

OTHER PUBLICATIONS

Search Report and Written Opinion issued in corresponding International Application No. PCT/JP2012/073976 mailed Nov. 6, 2012.

(Continued)

*Primary Examiner* — Kristal Feggins
(74) *Attorney, Agent, or Firm* — Banner & Witcoff, Ltd.

(57) ABSTRACT

There is provided a double-sided pressure-sensitive adhesive tape which includes a first pressure-sensitive adhesive layer formed by using any of different types of adhesive samples. Thereby the first pressure-sensitive adhesive layer is adjusted so as to satisfy conditions that, slow peel strength when a printing tape made of a PET film is peeled off from the substrate film of the double-sided pressure-sensitive adhesive tape by 5 mm at peel rate of 0.5 mm/minute is 0.45 N/20 mm or higher and storage modulus of the adhesive layer is in a range from 90.7 kPa to 435 kPa. By improving adhesiveness to the printing tape under environmental temperature from a low temperature to a normal temperature, the double-sided pressure-sensitive adhesive layer renders the printing tape less apt to peel off.

3 Claims, 6 Drawing Sheets

(56) References Cited

U.S. PATENT DOCUMENTS

| | | | | |
|---|---|---|---|---|
| 6,824,839 B1* | 11/2004 | Popat et al. | | 347/105 |
| 6,857,736 B2* | 2/2005 | Onishi et al. | | 347/105 |
| 6,861,109 B2* | 3/2005 | Takahashi et al. | | 428/32.31 |
| 6,884,843 B2 | 4/2005 | Kauffman et al. | | |
| 6,891,555 B2* | 5/2005 | Minowa et al. | | 347/171 |
| 8,227,054 B2* | 7/2012 | Ono et al. | | 347/105 |
| 8,506,073 B2* | 8/2013 | Liang | | 347/105 |
| 2002/0151438 A1* | 10/2002 | Mihara et al. | | 503/227 |
| 2003/0066600 A1 | 4/2003 | Kauffman et al. | | |
| 2003/0112311 A1* | 6/2003 | Naik et al. | | 347/105 |
| 2003/0134138 A1* | 7/2003 | Kreckel et al. | | 428/542.2 |
| 2007/0147937 A1 | 6/2007 | Hioki et al. | | |

FOREIGN PATENT DOCUMENTS

| | | |
|---|---|---|
| JP | 2003-001785 A | 1/2003 |
| JP | 2007-176013 A | 7/2007 |

OTHER PUBLICATIONS

International Preliminary Report on Patentability mailed Apr. 17, 2014 in corresponding International Application No. PCT/JP2012/073976, English translation.

* cited by examiner

FIG. 4

| ADHESIVE SAMPLE | AMT. OF CROSSLINKING Wt. % | SLOW PEEL STRENGTH N/20mm | PEELING LENGTH ON ϕ6mm TUBE mm | STORAGE MODULUS kPa (5°C) | ADHESIVENESS AT LOW TMP. NUM. OF PEELING (−5°C) |
|---|---|---|---|---|---|
| 1 | 0.0 | 0.19 | 5 | 62.2 | 0 |
| 2 | 0.1 | 0.45 | 1 | 90.7 | 0 |
| 3 | 0.3 | 0.53 | 0 | 111.8 | 0 |
| 4 | 0.5 | 0.54 | 0 | 186.6 | 0 |
| 5 | 0.7 | 0.64 | 0 | 239.6 | 0 |
| 6 | 1.2 | 0.63 | 0 | 364.0 | 0 |
| 7 | 1.8 | 0.67 | 0 | 409.1 | 4 |
| 8 | 2.5 | 0.78 | 0 | 514.1 | 20 |

PRESSURE-SENSITIVE ADHESIVE FOR PRESSURE-SENSITIVE ADHESIVE TAPE, TAPE CASSETTE, AND TAPE PRINTER

CROSS REFERENCE TO RELATED APPLICATIONS

The present application is a continuation-in-part of PCT International Patent Application No. PCT/JP2012/073976 filed on Sep. 20, 2012, which claims priority from Japanese Patent Application No. JP 2011-222737, filed on Oct. 7, 2011, the disclosure of which is incorporated herein by reference in its entirety.

TECHNICAL FIELD

The disclosure relates to pressure-sensitive adhesive for a pressure-sensitive adhesive tape of which adhesiveness to a polyethylene terephthalate film is improved so as to render the polyethylene terephthalate film less apt to peel off, a tape cassette accommodating the pressure-sensitive adhesive tape and a tape printer employing the tape cassette.

BACKGROUND

As conventional art of this technical field, there has been known a tape cassette for creating a printed tape with a release sheet attached thereto. In the conventional tape cassette, a laminate film made of a polyethylene terephthalate film, an ink ribbon and a double-sided pressure-sensitive adhesive tape are separately accommodated in a wound state. The double-sided pressure-sensitive adhesive tape consists of a base film, a first pressure-sensitive adhesive layer at one side of the base film and a second pressure-sensitive adhesive layer at the other side thereof and a release sheet stuck to the second pressure-sensitive adhesive layer. Of the laminate film, a printed side having been printed by the ink ribbon is stuck to the first pressure-sensitive adhesive layer of the double-sided pressure-sensitive adhesive tape. Thereby, a printed tape with a release sheet attached thereto is created.

Regarding the above mentioned double-sided pressure-sensitive adhesive tape to be accommodated in the tape cassette, slow peel strength of the first pressure-sensitive adhesive layer on the base film is made higher than that of the second pressure-sensitive adhesive layer to which the release sheet is stuck, namely, slow peel strength of the first pressure-sensitive adhesive layer is made higher than (1 to 10 N/20 mm) at peel rate of 5 mm/minute. The first pressure-sensitive adhesive layer with the higher slow peel strength is adhered to the laminate film made of the polyethylene terephthalate film.

A printed tape created by using the above tape cassette, however, has had a problem such that a laminate film was apt to peel off from a first pressure-sensitive adhesive layer at an end of the printed tape because the first pressure-sensitive adhesive layer's adhesiveness to the laminate film was still insufficient.

Even if measures for enhancing adhesiveness of the first pressure-sensitive adhesive layer were taken, a laminate film gradually peeled off from the first pressure-sensitive adhesive layer of the double-sided pressure-sensitive adhesive tape with the passage of time. Therefore, an effective solution has been demanded.

SUMMARY

The disclosure has been made in view of the above mentioned problem and an object thereof is to provide pressure-sensitive adhesive for a pressure-sensitive adhesive tape of which adhesiveness to a polyethylene terephthalate film is improved so as to render the polyethylene terephthalate film less apt to peel off under environmental temperature from a low temperature to a normal temperature, a tape cassette accommodating the pressure-sensitive adhesive tape and a tape printer employing the tape cassette.

According to the disclosure, there is provided pressure-sensitive adhesive for a pressure-sensitive adhesive tape, the pressure-sensitive adhesive being applied on one surface of a substrate film of the pressure-sensitive adhesive tape so as to form a pressure-sensitive adhesive layer onto which a polyethylene terephthalate film is stuck, wherein the pressure-sensitive adhesive is adjusted so as to satisfy conditions that, slow peel strength when the polyethylene terephthalate film is peeled off from the substrate film of the pressure-sensitive adhesive tape by 5 mm at peel rate of 0.5 mm/minute is 0.45 N/20 mm or higher and storage modulus of the adhesive layer is in a range from 90.7 kPa to 435 kPa.

Further, according to the disclosure, there is provided a tape cassette for a tape printer which performs printing on a printing tape by using a thermal head, the tape cassette accommodating: a printing tape spool on which a printing tape made of a polyethylene terephthalate film is wound; a ribbon spool on which an ink ribbon is wound; and a double-sided pressure-sensitive adhesive tape spool on which a double-sided pressure-sensitive adhesive tape which includes a substrate film, pressure-sensitive adhesive layers formed on both surfaces of the substrate film and a release sheet stuck on one of the pressure-sensitive adhesive layers is wound, so that a print image such as character is formed on the printing tape by the thermal head and the ink ribbon while other one of the pressure-sensitive adhesive layers is stuck on the print image, wherein pressure-sensitive adhesive forming the pressure-sensitive adhesive layers of the double-sided pressure-sensitive adhesive tape is adjusted so as to satisfy conditions that, slow peel strength when the polyethylene terephthalate film is peeled off from the substrate film of the pressure-sensitive adhesive tape by 5 mm at peel rate of 0.5 mm/minute is 0.45 N/20 mm or higher and storage modulus of the adhesive layer is in a range from 90.7 kPa to 435 kPa.

Further, according to the disclosure, there is provided a tape printer comprising: a thermal head; a tape cassette accommodating a printing tape spool on which a printing tape made of a polyethylene terephthalate film is wound, a ribbon spool on which an ink ribbon is wound, and a double-sided pressure-sensitive adhesive tape spool on which a double-sided pressure-sensitive adhesive tape which includes a substrate film, pressure-sensitive adhesive layers formed on both surfaces of the substrate film and a release sheet stuck on one of the pressure-sensitive adhesive layers is wound, so that a print image such as character is formed on the printing tape by the thermal head and the ink ribbon while other one of the pressure-sensitive adhesive layers is stuck on the print image; and a conveyance unit drawing the printing tape, the ink ribbon and the double-sided pressure-sensitive adhesive tape from the printing tape spool, the ink ribbon spool and the double-sided pressure-sensitive adhesive tape spool, respectively, for conveyance of those, wherein pressure-sensitive adhesive forming the pressure-sensitive adhesive layers of the double-sided pressure-sensitive adhesive tape is adjusted so as to satisfy conditions that, slow peel strength when the polyethylene terephthalate film is peeled off from the substrate film of the pressure-sensitive adhesive tape by 5 mm at peel rate of 0.5 mm/minute is 0.45 N/20 mm or higher and storage modulus of the adhesive layer is in a range from 90.7 kPa to 435 kPa.

BRIEF DESCRIPTION OF THE DRAWINGS

FIG. 4 is a table showing values of physical properties measured with respect to eight types of pressure-sensitive adhesive layers each made of one of the eight adhesive samples prepared by varying amount of crosslinking agent to be added.

DETAILED DESCRIPTION

A detailed description of an exemplary embodiment of pressure-sensitive adhesive for a pressure-sensitive adhesive tape of the disclosure will now be given referring to the accompanying drawings.

First, schematic configuration of a tape printer directed to the present embodiment will be described by referring to FIG. 1 and FIG. 2.

Figure 1:
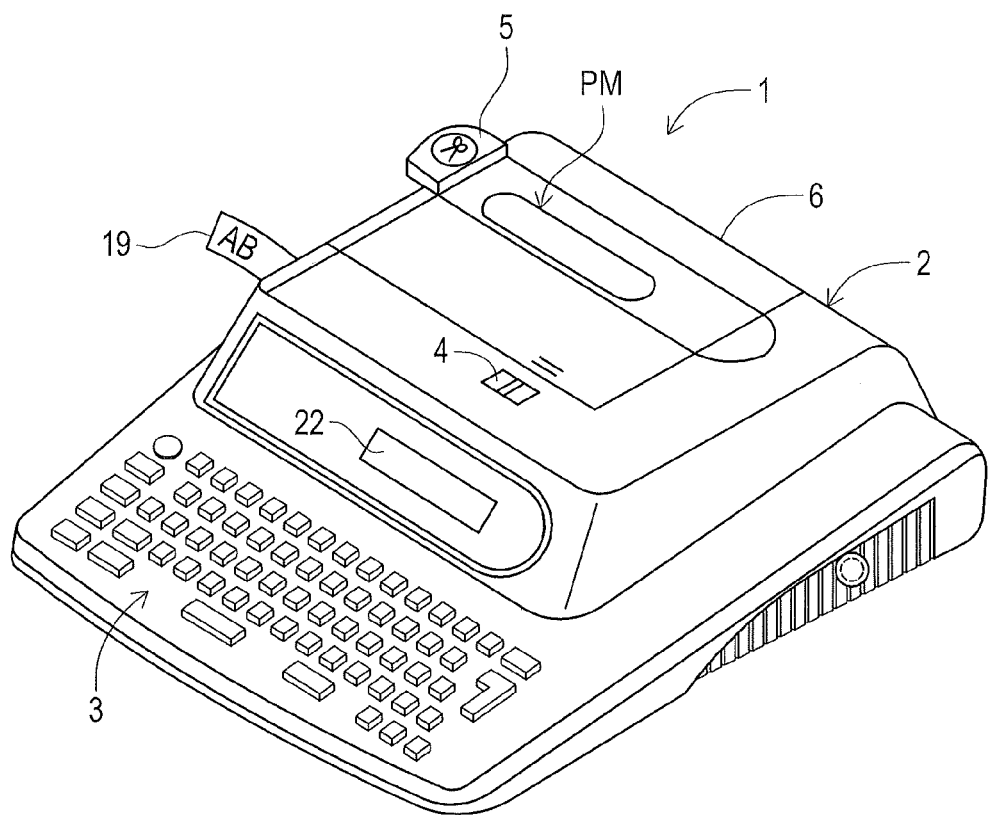
FIG. 1 is a perspective view of a tape printer directed to the present embodiment.
Figure 2:
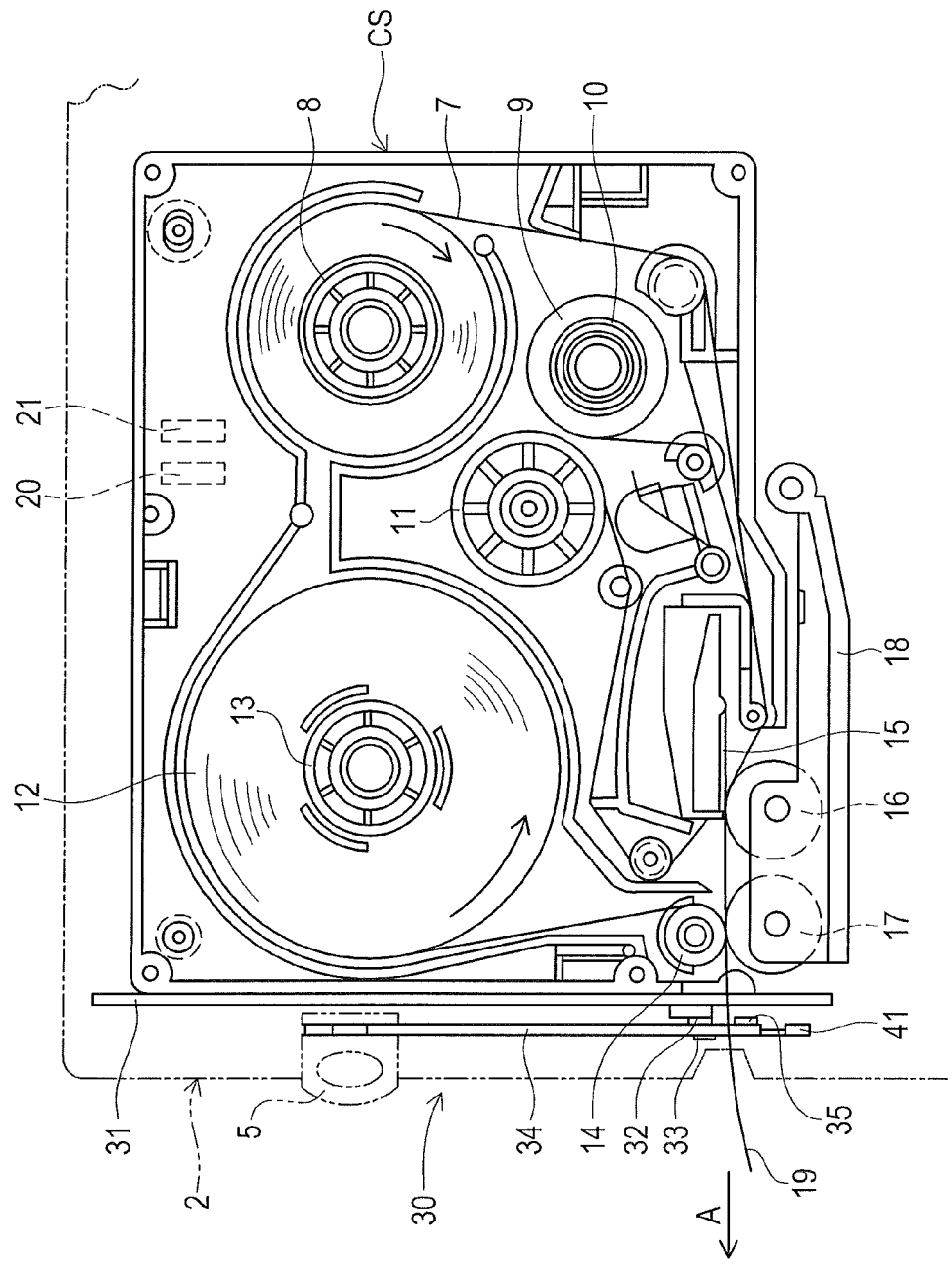
FIG. 2 is a partial enlarged cross-sectional view inside a main body frame of the tape printer accommodating a tape cassette therein.

A tape printer 1 shown in FIG. 1 includes a main body frame 2, a keyboard 3 arranged in front of the main body frame 2, a printing mechanism PM arranged at the rear inside of the main frame body 2, a liquid crystal display 22 configured to display characters and signs and arranged immediately behind the keyboard 3, and a cover frame 6 for covering a top surface of the main body frame 2, etc. On the top surface of the main body frame 2, there is arranged a release button 4 for opening the cover frame 6 when replacing a tape cassette CS to be set in the printing mechanism PM. Further, at a side end of the cover frame 6 (left-side end in FIG. 1), there is arranged a cutter button 5 for cutting off a printed tape 19 by hand.

The keyboard 3 includes plural operation keys such as character input keys for inputting characters, numbers, signs and the like, a space key, a return key, a line feeding key, cursor keys for moving a cursor leftward or rightward, a character-size setting key for arbitrarily setting font of a to-be-printed character, etc.

Configuration of the printing mechanism PM will be described by referring to FIG. 2. In the printing mechanism PM, a rectangular-shaped tape cassette CS is accommodated in a replaceable manner. Inside the tape cassette CS, there are rotatably arranged a printing tape spool 8, an ink ribbon spool 10, an ink-ribbon take-up spool 11, a double-sided pressure-sensitive adhesive tape spool 13 and a bonding roller 14. The printing tape spool 8 holds thereon a printing tape 7 made of a transparent polyethylene terephthalate (shortened as PET, hereinafter) film. The ink ribbon spool 10 holds thereon an ink ribbon 9 made of a base film coated with ink which melts when heated. The ink-ribbon take-up spool 11 takes up a used ink ribbon 9. The double-sided pressure-sensitive adhesive tape spool 13 holds thereon a double-sided pressure-sensitive adhesive tape 12 having width the same as width of the printing tape 7. The double-sided pressure-sensitive adhesive tape 12 is wound around there so that a release sheet is located outside. The bonding roller 14 is used for bonding the printing tape 7 and the double-sided pressure-sensitive adhesive tape 12 together. It is to be noted that the double-sided pressure-sensitive adhesive tape 12 consists of a substrate film, pressure-sensitive adhesive layers on both surfaces of the substrate film and a release sheet stuck on one of the pressure-sensitive adhesive layers (to be described later).

A thermal head 15 is arranged upright at a position where the printing tape 7 and the ink ribbon 9 overlap. A support body 18 is pivotally supported on the main body frame 2. The support body 18 rotatably supports a platen roller 16 and a conveyance roller 17. The platen roller 16 is provided for pressing the printing tape 7 and the ink ribbon 9 to the thermal head 15. The conveyance roller 17 is provided for pressing the printing tape 7 and the double-sided pressure-sensitive adhesive tape 12 to the bonding roller 14 so as to complete a printed tape 19. The thermal head 15 is configured such that heating element arrays (not shown) consisting of 128 of heating elements are arranged vertically with reference to a tape surface.

While the bonding roller 14 and the ribbon take-up spool 11 are synchronously rotated in a predetermined direction by a tape feeding motor (not shown), the heating element arrays are electrically energized so that heating elements selectively heated up thereby transmit heat onto the ink ribbon 9. Heat applied by the heating elements melts the ink on the ink ribbon 9 and thermally transmits an image onto the printing tape 7. Thereby, a character or the like is printed on the printing tape 7 in a form of plural dot lines while the printing tape 7 with the double-sided pressure-sensitive adhesive tape 12 bonded thereto is conveyed in a tape conveyance direction A as a printed tape 19. As shown in FIG. 1 and FIG. 2, the printed tape 19 is further conveyed to the outside (left side in FIG. 1) of the main body frame 2. Incidentally, the configuration of the printing mechanism PM will not be described in detail because the configuration is a heretofore known art.

Next, there will be described a cutter 30 for cutting the printed tape 19 by hand, by referring to FIG. 2. Inside the main body frame 2, a plate-like support frame 31 is arranged upright. A fixed blade 32 is directed upward and fixed to the support frame 31. A pivotal shaft 33 fixed to the support frame 31 pivotally supports a near-front end portion of an operation lever 34 which is movable back and forth. A movable blade 35 is attached to the operation lever 34 at a position ahead of the pivotal shaft 33 located in the operation lever 34 so as to face the fixed blade 32.

A rear end portion of the operation lever 34 is positioned below the cutter button 5. The operation lever 34 is always elastically urged by a spring member (not shown) in a direction to make the movable blade 35 stay away from the fixed blade 32. At the front end portion of the operation lever 34, a cutter switch 41 is arranged so as to detect that depression of the cutter button 5 has caused the operation lever 34 to pivotally move for cutting operation.

Since the printed tape 19 reaches the outside of the main body frame 2 through a space between the fixed blade 32 and the movable blade 35 when printing of a character, etc. is completed, depression of the cutter button 5 causes the movable blade 32 to approach the fixed blade 35 via the operation lever 34 and to cut off the printed tape 19.

Next, there will be described a configuration of the double-sided pressure-sensitive adhesive tape 12 accommodated in the tape cassette CS by referring to FIG. 3.

Figure 3:
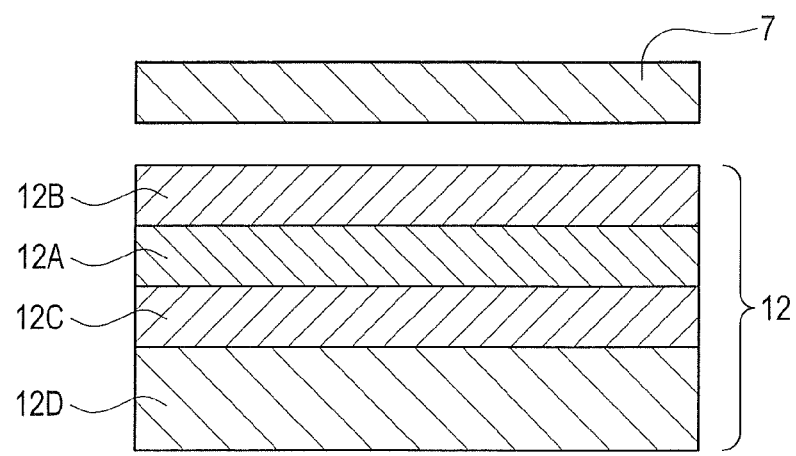
FIG. 3 is a cross-sectional view schematically illustrating configuration of a double-sided pressure-sensitive adhesive tape.

As shown in FIG. 3, the double-sided pressure-sensitive adhesive tape 12 consists of a substrate film 12A made of a PET film; a first pressure-sensitive adhesive layer 12B formed on one surface (upper surface in FIG. 3) of the substrate film 12A; a second pressure-sensitive adhesive layer 12C formed on the other surface of (lower surface in FIG. 3) of the substrate film 12A; and a release sheet 12D stuck on the second pressure-sensitive adhesive layer 12C.

It is to be noted that what is depicted above the double-sided pressure-sensitive adhesive tape 12 is a printing tape 7 made of a PET film and that the printing tape 7 and that the first pressure-sensitive adhesive layer 12B of the double-sided pressure-sensitive adhesive tape 12 are bonded together by cooperation of the bonding roller 14 and the conveyance roller 17.

[Embodiment]

Next will be discussed embodiments of the adhesive to be used in the first pressure-sensitive adhesive layer 12B and the second pressure-sensitive adhesive layer 12C according to FIG. 4.

The adhesive composing the first pressure-sensitive adhesive layer 12B and the second pressure-sensitive adhesive layer 12C basically includes an acrylic adhesive agent (AS-5539, available from Ipposha Oil Industries, Co., Ltd.), an isocyanate crosslinking agent (L-45E, available from Nippon Polyurethane Industry Co., Ltd) and a terpene-phenolic tackifier (YS resin TO125, available from Yasuhara Chemical Co., Ltd.). The content of the isocyanate crosslinking agent with regard to the acrylic adhesive agent and the terpene-phenolic tackifier has been variously adjusted within a range of 0.0 wt. % -2.5 wt. % and eight types of adhesive samples, namely, adhesive samples 1-8 were prepared.

Here, the content of crosslinking agent is 0.0 wt. % in the adhesive sample 1. The content of crosslinking agent is: 0.1 wt. % in the adhesive sample 2; 0.3 wt. % in the adhesive sample 3; 0.5 wt. % in the adhesive sample 4; 0.7 wt. % in the adhesive sample 5; 1.2 wt. % in the adhesive sample 6; 1.8 wt. % in the adhesive sample 7; and 2.5 wt. % in the adhesive sample 8.

The storage modulus (kPa) was measured at an ambient temperature of 5 degrees C., with regard to eight types of pressure-sensitive adhesive layers each made of one of the above eight adhesive samples prepared as above.

The storage modulus of each of the adhesive samples 1-8 was measured as below.

(1) Each adhesive of the adhesive samples 1-8 was applied on one side of a PET film to form a pressure-sensitive adhesive layer thereon, so that a single-sided pressure-sensitive adhesive tape was prepared. Sixteen layers of the single-sided pressure-sensitive adhesive tapes were laminated with the PET film of each single-sided pressure-sensitive adhesive tape positioned upside, without allowing air to enter therebetween. In this state, the PET film was present at the uppermost face of the sixteen layers of the single-sided pressure-sensitive adhesive tapes.

(2) On top of the PET film at the uppermost face of the sixteen layers of the single-sided pressure-sensitive adhesive tapes stuck together, there was adhered a double-sided pressure-sensitive adhesive tape prepared through applying the above adhesive of the adhesive samples 1-8 on both sides of a PET film to form pressure-sensitive adhesive layers thereon.

(3) Accordingly, seventeen layers were stuck together in total to form a laminate body. The laminate body was punched out into a shape of φ8 mm, using a punch or the like. Thus, measurement objects respectively corresponding to the adhesive samples 1-8 were obtained.

(4) Each of the measurement objects obtained as above was set between a plate and parallel plates of a storage-modulus measuring apparatus (an AR-G2 rheometer, available from TA Instruments Ltd.) at a controlled temperature of 5 degrees C., and was made to move reciprocally and rotationally at frequency of 3 Hz and a distortion amount of 0.3 per cent, while applying a load of 0.98 N to the parallel plates. Thus, the storage modulus of a measurement object was measured.

(5) The value of storage modulus measured as above was a value measured including PET films; therefore was converted using a mathematical formula below in order to eliminate the influence of the PET films, and to obtain the storage modulus of adhesive layers.

$$\text{adhesive's storage modulus} = \frac{\text{storage modulus of laminate body} \times \text{total thickness of adhesives}}{\text{total thickness of PET films and adhesive}}$$

[Mathematical Formula 1]

The storage moduli of the eight types of pressure-sensitive adhesive layers each formed of one of the adhesive samples 1-8 measured by the aforementioned process are shown in FIG. 4. As shown in FIG. 4, the storage modulus of the adhesive layer is: 62.2 kPa in the adhesive sample 1; 90.7 kPa in the adhesive sample 2; 111.8 kPa in the adhesive sample 3; 186.6 kPa in the adhesive sample 4; 239.6 kPa in the adhesive sample 5; 364.0 kPa in the adhesive sample 6; 409.1 kPa in the adhesive sample 7, and 514.1 kPa in the adhesive sample 8.

Then, slow peel strength was measured with regard to adhesive layers formed on a double-sided pressure-sensitive adhesive tape. The double-sided pressure-sensitive adhesive tape was obtained through applying each adhesive of the adhesive samples 1-8 on both sides of a substrate film made of a PET film to form the adhesive layers thereon. The slow peel strength was measured at ambient temperature of 23±1 degrees C., using a measuring apparatus "Autograph AG-IS" available from Shimadzu Corporation, according to the following steps.

(1) First, a surface of a PET film to serve as a measurement surface was wiped and cleaned up with a rag, using ethyl acetate.

(2) A PET film for reinforcement with thickness of 25 μm was bonded onto an adhesive layer opposite to a surface intended for the measurement of the slow peel strength, in the double-sided pressure-sensitive adhesive tape.

(3) An adhesive layer on the measurement surface side of the double-sided pressure-sensitive adhesive tape thus reinforced was placed onto the measurement surface of the PET film wiped and cleaned up by the rag, and a rubber roller of 3 kg was made to go back and forth three times to complete bonding thereof.

(4) Thereafter, the PET film was secured onto a stainless plate (SUS plate) such that the longer direction of the double-sided pressure-sensitive adhesive tape bonded onto the PET film is vertically arranged.

(5) After 30 minutes of standing, a lower end of the double-sided pressure-sensitive adhesive tape in a vertical-state was hooked by a measurement portion, and was peeled off at an angle of 90 degrees, at a slow peel rate of 0.5 mm/minute in a horizontal direction with regard to the stainless plate.

(6) The peeling strength when the double-sided pressure-sensitive adhesive tape was peeled off by 5 mm at the above peeling rate was measured at the measurement portion as the slow peel strength.

Figure 5:
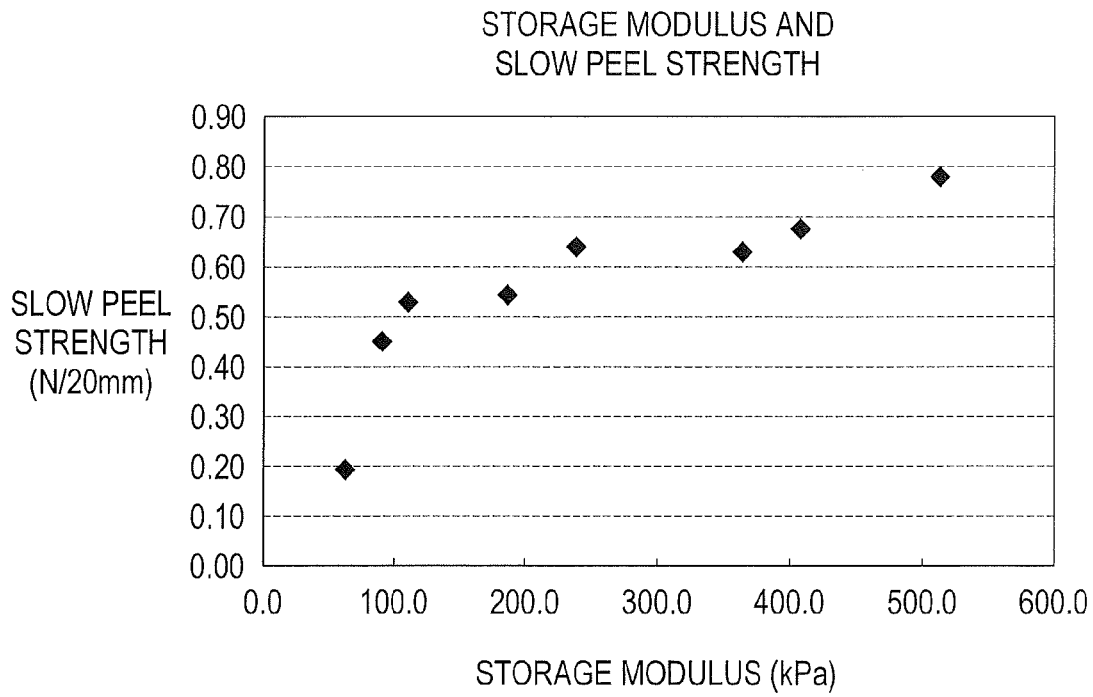
FIG. 5 is a graph showing a relation between storage modulus and slow peel strength with respect to the eight types of pressure-sensitive adhesive layers each made of one of the eight adhesive samples.

The slow peel strength thus measured in connection with the storage modulus of the eight types of pressure-sensitive adhesive layers each formed of one of the adhesive samples 1-8 are shown in FIG. 4. A graph showing a relation between the storage modulus and the slow peel strength with respect to the eight types of pressure-sensitive adhesive layers each made of one of the eight adhesive samples is shown in FIG. 5. In FIG. 5, the storage modulus and the slow peel strength of the adhesive layer of each of the adhesive samples 1-8 are plotted as abscissae and ordinates, respectively.

In FIG. 4, the slow peel strength of the adhesive layer is: 0.19 N/20 mm in the adhesive sample 1 with the content of the crosslinking agent being 0; 0.45 N/20 mm in the adhesive sample 2 with the crosslinking agent included by 0.1 wt. %; 0.53 N/20 mm in the adhesive sample 3 with the crosslinking agent included by 0.3 wt. %; 0.54 N/20 mm in the adhesive sample 4 with the crosslinking agent included by 0.5 wt. %; 0.64 N/20 mm in the adhesive sample 5 with the crosslinking agent included by 0.7 wt. %; 0.63 N/20 mm in the adhesive sample 6 with the crosslinking agent included by 1.2 wt. %; 0.67 N/20 mm in the adhesive sample 7 with the crosslinking agent included by 1.8 wt. %; and 0.78 N/20 mm in the adhesive sample 8 with the crosslinking agent included by 2.5 wt. %.

Tendency of the plot shown in the graph of FIG. 5 shows that, among the slow peel strengths of the eight types of pressure-sensitive adhesive layers each made of one of the adhesive samples 1-8 as measured in the above, the adhesive layer of the adhesive sample 1 whose slow peel strength is 0.19 N/20 mm is too weak with regard to adhesive strength to a PET film, and it can be assumed that a printing tape 7 made of a PET film will peel off from the first pressure-sensitive adhesive layer 12B in a short period of time. In contrast, the pressure-sensitive adhesive layers of the adhesive samples 2-8 have the slow peel strengths with a tendency to be discontinuously higher from the slow peel strength of the adhesive layer of the adhesive sample 1, and to gradually increase. Therefore, in order to render the printing tape 7 made of a PET film less apt to peel off from the first pressure-sensitive adhesive layer 12B of the double-sided pressure-sensitive adhesive tape 12 under an environment of normal temperature (23±1 degrees C.), it is necessary that the storage modulus be 90.7 kPa or higher and the slow peel strength be 0.45 N/20 mm or higher, as in seven types of pressure-sensitive adhesive layers each made of one of the adhesive samples 2-8.

Next, the eight types of pressure-sensitive adhesive layers each formed of one of the adhesive samples 1-8 were then measured with regard to adhesiveness at a low temperature of −5 degrees C.

Adhesiveness at a low temperature was measured according to the steps below.

(1) First, each of the adhesive samples 1-8 was applied on both sides of a substrate film 12A. Thus, there were prepared eight types of double-sided pressure-sensitive adhesive tapes 12 each having a first pressure-sensitive adhesive layer 12B and a second pressure-sensitive adhesive layer 12C on both sides of the substrate film 12A.

(2) Each of the eight types of double-sided pressure-sensitive adhesive tapes 12 each corresponding to one of the adhesive samples 1-8 was wound around double-sided pressure-sensitive adhesive tape spool 13, and the spool 13, a printing tape spool 8 with a printing tape 7 wounded therearound, an ink ribbon spool 10 with an ink ribbon 9 wounded therearound, etc. were assembled inside a tape cassette CS. Thus, eight types of tape cassettes were produced.

(3) The tape cassettes and a tape printer (PT-9500 available from Brother Industries, Ltd.) were stored and kept for two hours inside a thermostatic chamber controlled at −5 degrees C.

(4) Each tape cassette thus sufficiently-cooled was set inside the tape printer and twenty half cuts were continuously provided at an interval of 20 mm while printing characters, etc. onto the printing tape 7, so that a printed tape 19 with twenty half-cut segments in the printing tape 7 was prepared. Thus, printed tapes 19 were prepared using the eight types of double-sided pressure-sensitive adhesive tapes 12 each corresponding to one of the adhesive samples 1-8.

(5) Immediately after preparing each printed tape 19, there was counted the number of peeling segments in the printing tape 7 having peeled-off at half cut portions from the first pressure-sensitive adhesive layer 12B of the double-sided pressure-sensitive adhesive tape 12 in the thermostatic chamber at −5 degrees C., by visual inspection. A standard for counting the number of peeling segments in the printing tape 7 is such that the peeling in a whole width of a segment of the printing tape 7 is judged as having peeled off, while the peeling in only a corner portion of a segment of the printing tape 7 is judged as not having peeled off.

Figure 6:
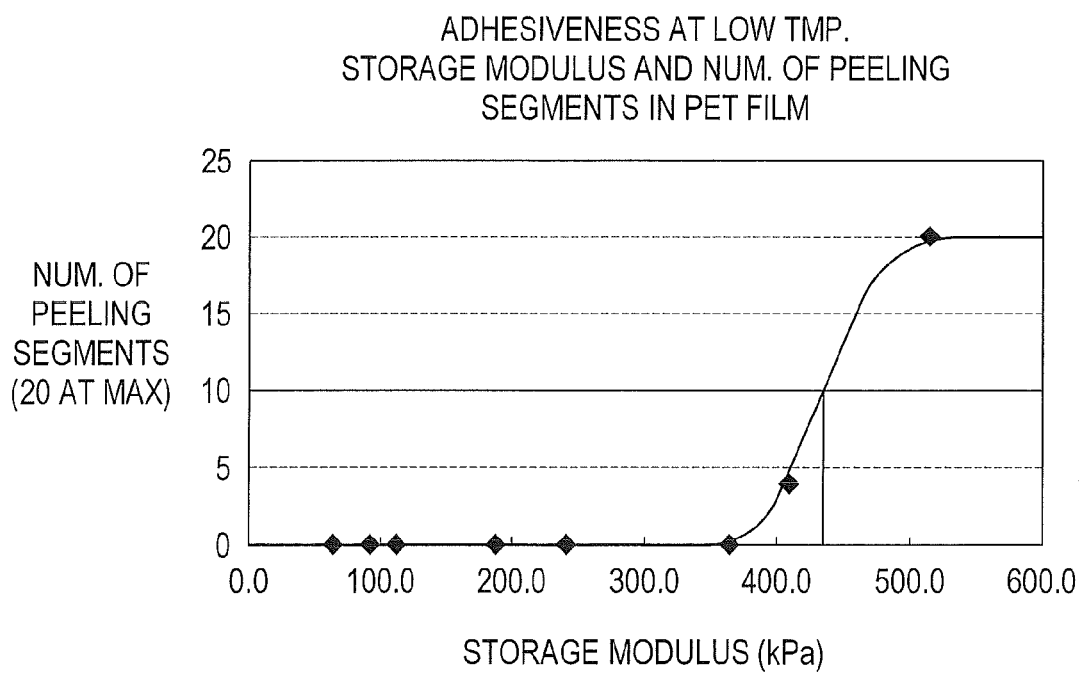
FIG. 6 is a graph showing a relation between storage modulus and the number of peeling segments in a polyethylene terephthalate film at 5 degrees C. with respect to the eight types of pressure-sensitive adhesive layers each made of one of the eight adhesive samples.

FIG. 4 shows correlation of thus-measured adhesiveness at a low temperature with thus-measured storage modulus with respect to the eight types of pressure-sensitive adhesive layers each formed of one of the adhesive samples 1-8. FIG. 6 is a graph showing a relation between storage modulus and adhesiveness at a low temperature with respect to the eight types of pressure-sensitive adhesive layers each formed of one of the adhesive samples 1-8. In FIG. 6, the storage modulus and the adhesiveness at a low temperature (the number of peeling segments in the printing tape) of each of the adhesive samples 1-8 are plotted as abscissae and ordinates, respectively.

FIG. 4 shows that no observable peeling was found among twenty half-cut segments in the printing tape 7 of any of the double-sided pressure-sensitive adhesive tapes 12 of which first adhesive layers 12B were formed by using the adhesive samples 1-6. Peeling was observed in four segments among twenty half-cut segments in the printing tape 7 of the double-sided pressure-sensitive adhesive tape 12 of which first pressure-sensitive adhesive layer 12B was formed by using the adhesive sample 7. Peeling was observed in all the twenty half-cut segments in the printing tape 7 of the double-sided pressure-sensitive adhesive tape 12 of which the first pressure-sensitive adhesive layer 12B was formed by using the adhesive sample 8.

Here, the first pressure-sensitive adhesive layer 12B is regarded as having better adhesiveness at a low temperature as the number of peeling segments in a printing tape 7 is smaller. However, taking into consideration that partial peeling hardly causes a problem in a segment of the printing tape 7, different from a case of peeling in a whole width, peeling in ten segments in the printing tape 7 or less suggests that the first pressure-sensitive adhesive layer 12B has satisfactory adhesiveness at a low temperature.

Then, if a point of ten peeling segments in a printing tape 7 (an intersection point of the graph and a straight line indicating where ten segments are peeling) is extrapolated in the storage modulus in the abscissae as shown in the graph of FIG. 6, the value of a storage modulus is 435 kPa.

Thus, it is required of the storage modulus of the pressure-sensitive adhesive layer to be 435 kPa or lower, as in the pressure-sensitive adhesive layers of the adhesive samples 1-7, so as to be capable of preventing the printing tape 7 from peeling off from the first pressure-sensitive adhesive layer 12B at a low temperature of −5 degree C.

One reason for choosing '15 degrees C. as a temperature for measuring the adhesiveness at a low temperature with respect to the adhesive samples is that indoor environment temperature can be as low as around −5 degree C. in winter.

The printed tape 19 produced by the tape printer 1 is used by sticking on various kinds of adherends, and the chances are high that it will be stuck onto an adherend having a curved surface. Considering such usage, there was measured a peeling length for the printing tape 7 to peel off from the first pressure-sensitive adhesive layer 12B in such a situation.

The peeling length of the printing tape 7 was measured in the following steps.

(1) The adhesive samples 1-8 were used to form the first and second pressure-sensitive adhesive layers 12B and 12C on both sides of the substrate film 12A, so as to produce eight types of double-sided pressure-sensitive adhesive tapes 12. Each of the double-sided pressure-sensitive adhesive tapes 12 was stuck around an outer circumference of a polypropylene tube of an approximately 5 mm. outer diameter φ6 mm, with an end portion thereof overlapped by (2) Each polypropylene tube was stored for 24 hours under an environment of the temperature of 50 degrees C., and the humidity of 90%.

(3) After storage, the end portion of each of the double-sided pressure-sensitive adhesive tapes 12 stuck around polypropylene tubes was observed with a graduated magnifying glass at a room temperature, and peeling length for the printing tape 7 to peel off from the first pressure-sensitive adhesive layer 12B was measured.

Figure 7:
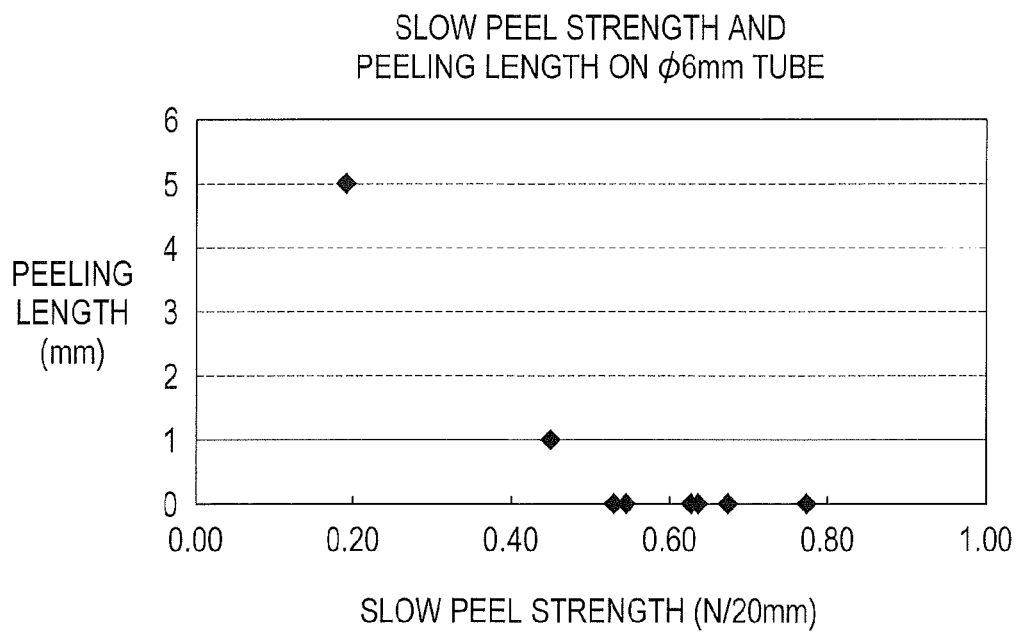
FIG. 7 is a graph showing a relation between slow peel strength and peeling length of a polyethylene terephthalate film with respect to the eight types of pressure-sensitive adhesive layers each made of one of the eight adhesive samples.

FIG. 4 shows correlation of the length by which the printing tape 7 has peeled off from the first pressure-sensitive adhesive layers 12B in the double-sided pressure-sensitive adhesive tapes 12 with the slow peel strength with respect to the eight types of pressure-sensitive adhesive layers each formed of one of the adhesive samples 1-8. A graph showing a relation between the slow peel strength and the peeling length of the printing tape 7 is shown in FIG. 7. In FIG. 7, the slow peel strengths of the eight types of pressure-sensitive adhesive layers each made of one of the adhesive samples 1-8 as mentioned above and the peeling lengths of the printing tapes 7 are plotted as abscissae and ordinates, respectively.

FIG. 4 shows that, in the double-sided pressure-sensitive adhesive tape 12 with the first adhesive layer 12B formed by using each of the adhesive samples 3-8, the slow peel strength is 0.53 N/20 mm or higher, and the peeling length for the printing tape 7 to peel off from the first pressure-sensitive adhesive layer 12B is 0 mm in the double-sided pressure-sensitive adhesive tape 12, and no peeling of the printing tape 7 is observed. In the double-sided pressure-sensitive adhesive tape 12 using the adhesive sample 2 of which the slow peel strength is 0.45 N/20 mm, the peeling length for the printing tape 7 to peel off from the first pressure-sensitive adhesive layer 12B is 1 mm. Further, in the double-sided pressure-sensitive adhesive tape 12 using the adhesive sample 1 of which the slow peel strength is 0.19 N/20 mm, the peeling length for the printing tape 7 to peel from the first pressure-sensitive adhesive layer 12B is 5 mm.

The shorter peeling length for the printing tape 7 to peel off from the first pressure-sensitive adhesive layer 12B is regarded better; however, the peeling length of 1 mm or shorter is hard to recognize by visual inspection and not conspicuous, therefore the peeling length of 1 mm or shorter is satisfactory.

Then, if a point of 1-mm peeling length of the printing tape 7 (an intersection of the graph and a straight line indicating where the peeling length is 1 mm) is extrapolated in the storage modulus in the abscissae as shown in the graph of FIG. 7, the value of a slow peel strength is 0.45 N/20 mm.

Accordingly, considering the chances of the printed tape 19 to be used being stuck onto an adherend having a curved surface, the slow peel strength of the first pressure-sensitive adhesive layer 12B is 0.45 N/20 mm or higher, similar to the pressure sensitive adhesive layers of the adhesive samples 2-8, in order to limit the peeling length of the printing tape 7 from the first pressure-sensitive adhesive layer 12B within 1 mm or shorter.

Figure 8:
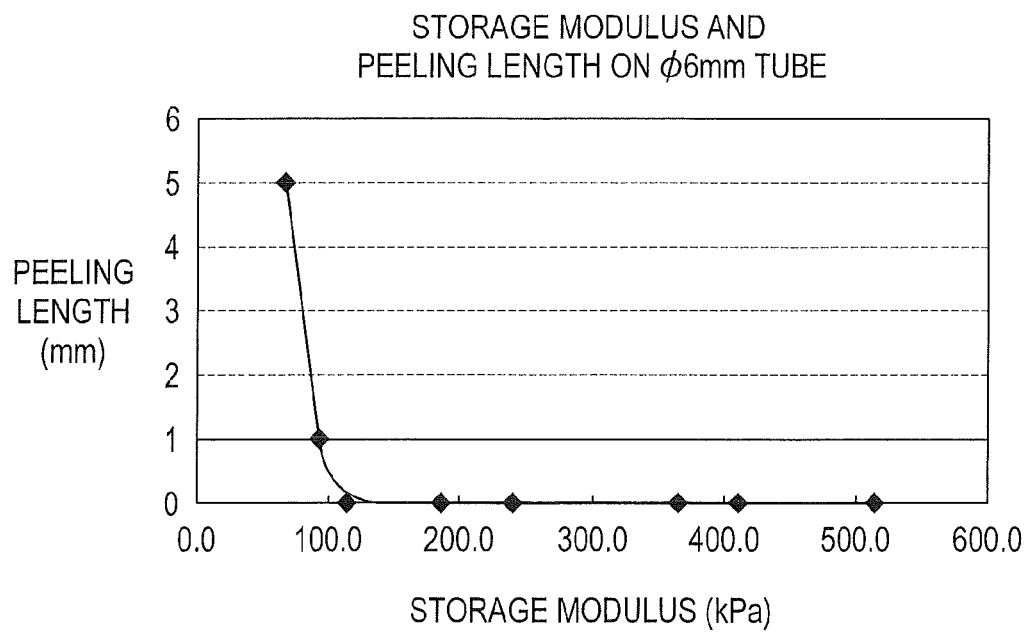
FIG. 8 is a graph showing a relation between storage modulus and peeling length of a polyethylene terephthalate film with respect to the eight types of pressure-sensitive adhesive layers each made of one of the eight adhesive samples.

Next, regarding the eight types of first pressure-sensitive adhesive layers 12B each formed of one of the adhesive samples 1-8, a relation between thus measured storage modulus and peeling length for the printing tape 7 to peel off from the first pressure-sensitive adhesive layer 12B when the double-sided pressure-sensitive adhesive tape 12 is stuck around the tube of an outer diameter φ6 mm is plotted into a graph shown in FIG. 8. In the graph shown in FIG. 8, the storage modulus (kPa) is plotted as abscissae and the peeling length for the printing tape 7 to peel off from the first pressure-sensitive adhesive layer 12B when the double-sided pressure-sensitive adhesive tape 12 is stuck around the tube of an outer diameter φ6 mm is plotted as ordinates.

As previously mentioned, allowable peeling length for the printing tape 7 to peel off from the first pressure-sensitive adhesive layer 12B is 1 mm or shorter. It is apparent that the first pressure-sensitive adhesive layer 12B is required to have storage modulus of 90.7 kPa or higher so as to limit peeling length within 1 mm.

As previously explained, to render the printing tape 7 made of a PET film less apt to peel off from a first pressure-sensitive adhesive layer 12B of the double-sided pressure-sensitive adhesive tape 12 at a normal temperature (23±1 degrees C.), it is required for pressure sensitive adhesive to satisfy conditions such that, storage modulus of the first pressure-sensitive adhesive layer 12B is 90.7 kPa or higher and slow peel strength is 0.45 N/20 mm or higher, as each of seven types of the pressure-sensitive adhesive layers formed of any of pressure-sensitive adhesive samples 2 through 8 satisfies.

Incidentally, to render the printing tape 7 less apt to peel off from the first pressure-sensitive adhesive layer 12B at a low temperature (−5 degrees C.), it is required for pressure sensitive adhesive to satisfy conditions such that storage modulus of the first pressure-sensitive adhesive layer 12B is 435 kPa or lower, as each of seven types of the pressure-sensitive adhesive layers formed of any of adhesive samples 1-7 satisfies. Further, in consideration of probable situation such that a printed tape 19 is stuck to an adherend having a curved surface, to keep the length 1 mm or shorter with respect to peeling length for a printing tape 7 to peel off from a first pressure-sensitive adhesive layer 12B, it is required for pressure-sensitive adhesive to satisfy conditions such that, slow peel strength is 0.45 N/20 mm or higher, as each of the seven types of pressure-sensitive adhesive layers formed of any of pressure-sensitive adhesive samples 2-8 satisfies.

In a case where the first pressure-sensitive adhesive layer 12B of the double-sided pressure-sensitive adhesive tape 12 is formed by using any of adhesive samples 2-7, slow peel strength when the printing film 7 made of a PET film is peeled off from the first pressure-sensitive adhesive layer 12B is 0.45

N/20 mm or higher and storage modulus of the first pressure-sensitive adhesive layer 12B is 90.7 kPa or higher under a normal temperature (23±1 degrees C.) and 435 kPa or lower under a low temperature (−5 degrees C.).

Accordingly, when the first pressure-sensitive adhesive layer 12B of the double-sided pressure-sensitive adhesive tape 12 is formed by using any of pressure adhesive samples 2-7, the first pressure-sensitive adhesive layer 12B thus formed can render the printing tape 7 less apt to peel off under environmental temperature from a low temperature (−5 degrees C.) to a normal temperature (23±1 degrees C.) even if the second pressure sensitive layer 12C is stuck to an adherend having a curved surface.

As described in the above, pressure-sensitive adhesive constituting the first pressure-sensitive adhesive layer 12B of the double-sided pressure-sensitive adhesive tape 12 directed to the embodiment is formed by using any of adhesive samples 2-7 so that the first pressure-sensitive adhesive layer 12B satisfies conditions such that, slow peel strength when the printing film 7 made of a PET film is peeled off from the substrate film 12A of the double-sided pressure-sensitive adhesive tape 12 by 5 mm at peel rate of 0.5 mm/minute is 0.45 N/20 mm or higher and storage modulus of the first pressure-sensitive adhesive layer 12B is in a range from 90.7 kPa to 435 kPa. Since adhesiveness to the printing tape 7 under environmental temperature from a low temperature to a normal temperature is thus improved, the pressure-sensitive adhesive renders the printing tape 7 less apt to peel off.

Regarding the tape cassette CS directed to the embodiment, the pressure-sensitive adhesive constituting the first pressure-sensitive adhesive layer 12B of the double-sided pressure-sensitive adhesive tape 12 is formed by using any of pressure sensitive adhesive samples 2-7 so that the first pressure-sensitive adhesive layer 12B satisfies conditions such that, slow peel strength when the printing film 7 made of a PET film is peeled off from the substrate film 12A of the double-sided pressure-sensitive adhesive tape 12 by 5 mm at peel rate of 0.5 mm/minute is 0.45 N/20 mm or higher and storage modulus of the first pressure-sensitive adhesive layer 12B is in a range from 90.7 kPa to 435 kPa. Since adhesiveness to the printing tape 7 under environmental temperature from a low temperature to a normal temperature is thus improved, the pressure-sensitive adhesive renders the printing tape 7 less apt to peel off when the first pressure-sensitive adhesive layer 12B on the substrate film 12A is stuck to a print image such as character formed on the printing tape 7 by the thermal head 15 and the ink ribbon 9.

Regarding the tape printer 1 directed to the embodiment, pressure-sensitive adhesive constituting the first pressure-sensitive adhesive layer 12B of the double-sided pressure-sensitive adhesive tape 12 is formed by using any of pressure sensitive adhesive samples 2 through 7 so that the pressure-sensitive adhesive layer 12B satisfies conditions such that, slow peel strength when the printing film 7 made of a PET film is peeled off from the substrate film 12A of the double-sided pressure-sensitive adhesive tape 12 by 5 mm at peel rate of 0.5 mm/minute is 0.45 N/20 mm or higher and storage modulus of the first pressure-sensitive adhesive layer 12B is in a range from 90.7 kPa to 435 kPa. Since adhesiveness to the printing tape 7 under environmental temperature from a low temperature to a normal temperature is thus improved, the pressure-sensitive adhesive renders the printing tape 7 less apt to peel off when the printing tape 7 is conveyed by the conveyance roller 17 and the first pressure-sensitive adhesive layer 12B on the substrate film 12A of the double-sided pressure-sensitive adhesive tape 12 is stuck to a print image such as character formed on the printing tape 7 by the thermal head 15 and the ink ribbon 9. Especially, even if a release sheet 12D is peeled off from a printed tape 19 created by the tape printer 1 and the second pressure-sensitive adhesive layer 12C on the substrate film 12A is stuck on an adherend having a curved surface, the pressure-sensitive adhesive can render the printing tape 7 less apt to peel off from the first pressure-sensitive adhesive layer 12B on the substrate film 12A. Therefore, visual neatness of the printed tape 19 stuck on the adherend having a curved surface can be kept for a long period of time.

While presently exemplary embodiments has been shown and described, it is to be understood that this disclosure is for the purpose of illustration and that various changes and modifications may be made without departing from the scope of the disclosure as set forth in the appended claims.

The disclosure provides pressure-sensitive adhesive for a pressure-sensitive adhesive tape of which adhesiveness to a polyethylene terephthalate film is improved so as to render the polyethylene terephthalate film less apt to peel off under environmental temperature from a low temperature to a normal temperature, a tape cassette accommodating the pressure-sensitive adhesive tape and a tape printer employing the tape cassette. The effect which the disclosure brings to the applicable industrial field is significant.

What is claimed is:

1. Pressure-sensitive adhesive for a pressure-sensitive adhesive tape, the pressure-sensitive adhesive being applied on one surface of a substrate film of the pressure-sensitive adhesive tape so as to form a pressure-sensitive adhesive layer onto which a polyethylene terephthalate film is stuck, wherein the pressure-sensitive adhesive is adjusted so as to satisfy conditions that, slow peel strength when the polyethylene terephthalate film is peeled off from the substrate film of the pressure-sensitive adhesive tape by 5 mm at peel rate of 0.5 mm/minute is 0.45 N/20 mm or higher and storage modulus of the adhesive layer is in a range from 90.7 kPa to 435 kPa.

2. A tape cassette for a tape printer which performs printing on a printing tape by using a thermal head, the tape cassette accommodating: a printing tape spool on which a printing tape made of a polyethylene terephthalate film is wound; a ribbon spool on which an ink ribbon is wound; and a double-sided pressure-sensitive adhesive tape spool on which a double-sided pressure-sensitive adhesive tape which includes a substrate film, pressure-sensitive adhesive layers formed on both surfaces of the substrate film and a release sheet stuck on one of the pressure-sensitive adhesive layers is wound, so that a print image such as character is formed on the printing tape by the thermal head and the ink ribbon while other one of the pressure-sensitive adhesive layers is stuck on the print image, wherein pressure-sensitive adhesive forming the pressure-sensitive adhesive layers of the double-sided pressure-sensitive adhesive tape is adjusted so as to satisfy conditions that, slow peel strength when the polyethylene terephthalate film is peeled off from the substrate film of the pressure-sensitive adhesive tape by 5 mm at peel rate of 0.5 mm/minute is 0.45 N/20 mm or higher and storage modulus of the adhesive layer is in a range from 90.7 kPa to 435 kPa.

3. A tape printer comprising:
a thermal head;
a tape cassette accommodating a printing tape spool on which a printing tape made of a polyethylene terephthalate film is wound, a ribbon spool on which an ink ribbon is wound, and a double-sided pressure-sensitive adhesive tape spool on which a double-sided pressure-sensitive adhesive tape which includes a substrate film, pressure-sensitive adhesive layers formed on both surfaces of the substrate film and a release sheet stuck on one of the pressure-sensitive adhesive layers is wound, so that a print image such as character is formed on the printing tape by the thermal head and the ink ribbon while other one of the pressure-sensitive adhesive layers is stuck on the print image; and a conveyance unit drawing the printing tape, the ink ribbon and the double-sided pressure-sensitive adhesive tape from the printing tape spool, the ink ribbon spool and the double-sided pressure-sensitive adhesive tape spool, respectively, for conveyance of those, wherein pressure-sensitive adhesive forming the pressure-sensitive adhesive layers of the double-sided pressure-sensitive adhesive tape is adjusted so as to satisfy conditions that, slow peel strength when the polyethylene terephthalate film is peeled off from the substrate film of the pressure-sensitive adhesive tape by 5 mm at peel rate of 0.5 mm/minute is 0.45 N/20 mm or higher and storage modulus of the adhesive layer is in a range from 90.7 kPa to 435 kPa.

* * * * *